Figure 1:
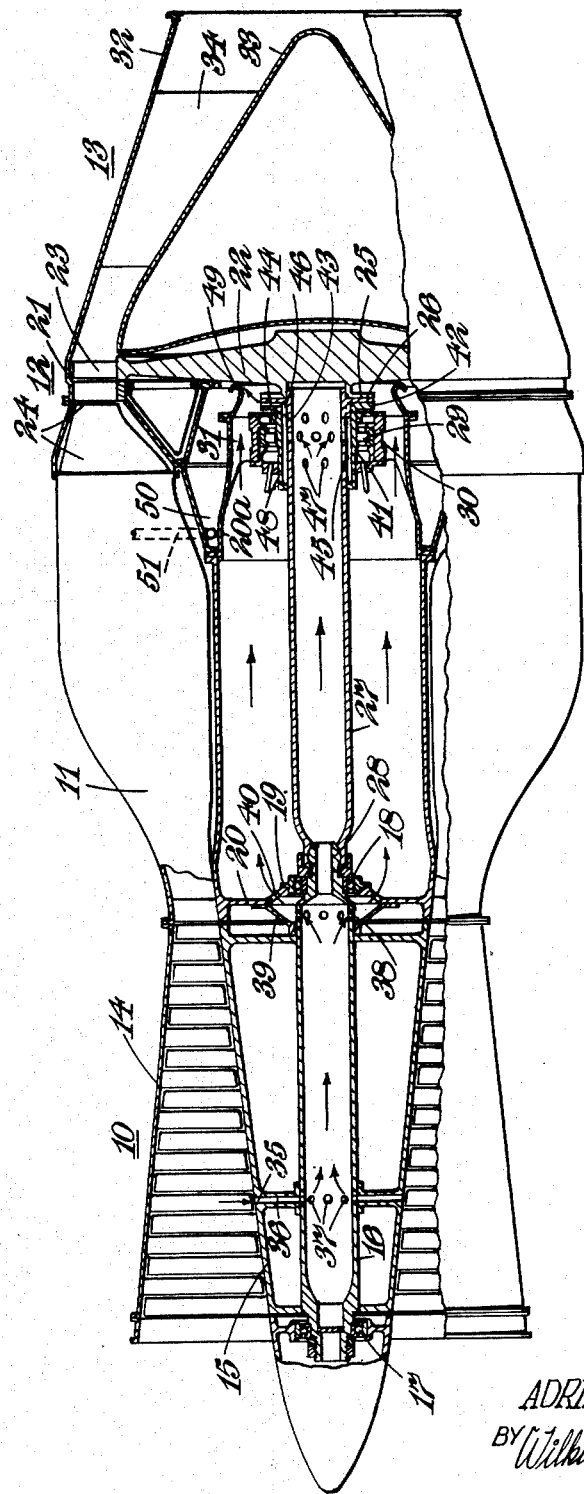

April 28, 1953     A. A. LOMBARD     2,636,665
GAS TURBINE ENGINE

Filed March 8, 1948     3 Sheets-Sheet 1

INVENTOR
ADRIAN A. LOMBARD
BY Wilkinson & Mawhinney
ATTORNEYS

Patented Apr. 28, 1953

2,636,665

UNITED STATES PATENT OFFICE 2,636,665

GAS TURBINE ENGINE

Adrian Albert Lombard, Allestree, England, assignor to Rolls-Royce Limited, Derby, England Application March 8, 1948, Serial No. 13,584
In Great Britain March 11, 1947

12 Claims. (Cl. 230—116)

This invention relates to gas-turbine-engines.

In such engines, it is the practice to bleed the air compressor, and/or to provide auxiliary fan blades on the turbine rotor disc or shaft to induce a flow of cooling air to bearings and the turbine disc and also to such other parts of the gas-turbine-engine as are subjected to high temperature effects or are required to be cooled.

The present invention has for an object to provide improved means for supplying cooling air to required parts of the gas-turbine-engine, whereby manufacture is facilitated. An economy in power absorbed for the supply of cooling air may also be effected.

According to the present invention, a gas-turbine-engine comprises a compressor and co-axially-arranged turbine, whereof the compressor rotor is formed with ports in the axial length thereof opening to a region of the compressor where the air has been compressed and is mounted on a hollow shaft drivingly connecting the compressor rotor to the turbine rotor, means to deliver air from said ports into the hollow shaft and outlet ports in the hollow shaft located adjacent bearing means supporting the shaft whereby air delivered into the shaft is constrained to flow over said bearing means to cool it. In the majority of cases in order to supply air which is at a sufficiently low temperature for cooling purposes, the air is delivered through ports which are located intermediate the compressor inlet and outlet so that the air is at a pressure and temperature less than that at the compressor outlet.

According to a feature of this invention, there are provided a plurality of bearing devices axially-spaced along the length of the shaft to support it and outlet ports in the shaft adjacent one or more of said bearing devices whereby air delivered into the shaft is constrained to flow over said bearing devices to cool them. For example, there may be provided a bearing device for the shaft adjacent the outlet end of the compressor rotor, outlets from the shaft adjacent said bearing, a second bearing device for the shaft adjacent the turbine rotor, and outlets from shaft, adjacent said second bearing device. Alternatively, there may be provided a bearing device for the shaft adjacent the outlet end of the compressor rotor, a second bearing device for the shaft adjacent the turbine rotor, outlets from the shaft adjacent the first said bearing device, and means to direct the air leaving the shaft through said outlets to flow over both said bearing devices to cool them.

In certain preferred constructions the compressor rotor is drivingly connected to the turbine rotor by means of a driving coupling permitting a degree of relative angular freedom between the rotors. It is a further feature of the invention that such a driving coupling is constructed in such a manner as to permit flow of air therethrough, whereby the air is conducted from the compressor rotor to the turbine shaft.

According to another feature of this invention, the gas-turbine-engine is provided with a hollow turbine rotor disc and the disc is mounted on the shaft in such manner as to permit air flowing in the shaft to flow into and through the turbine rotor disc to cool it.

Since the cooling air flowing through the turbine disc will pass into the gas flow through the engine, the cooling air must have a pressure greater at least than the back-pressure in the exhaust-assembly and therefore it is preferable in order to provide an adequate flow to abstract the air from a relatively high pressure region of the compressor. This means that the air will have a relatively elevated temperature (due to compression) which is greater than the preferred temperature for air employed in cooling the bearing devices but which is low with respect to the temperature at which the turbine disc will be designed to operate.

According to a further feature of this invention therefore, the hollow shaft is arranged to provide a pair of coaxial air ducts whereof one duct is supplied with air through ports in the compressor rotor opening to a region of the compressor where the air is compressed to a relatively low pressure and delivers the air to the shaft bearing means to cool them, and whereof the second duct is supplied with air through ports in the compressor rotor opening to a region of the compressor where the air is compressed to a relatively high pressure and delivers said air to the hollow turbine disc. In this way, relatively cool air can be supplied to the bearings, whilst air having an adequate pressure to maintain a sufficient flow through the turbine disc against the back pressure in the exhaust assembly, is supplied to the turbine disc to cool it.

Figure 2:
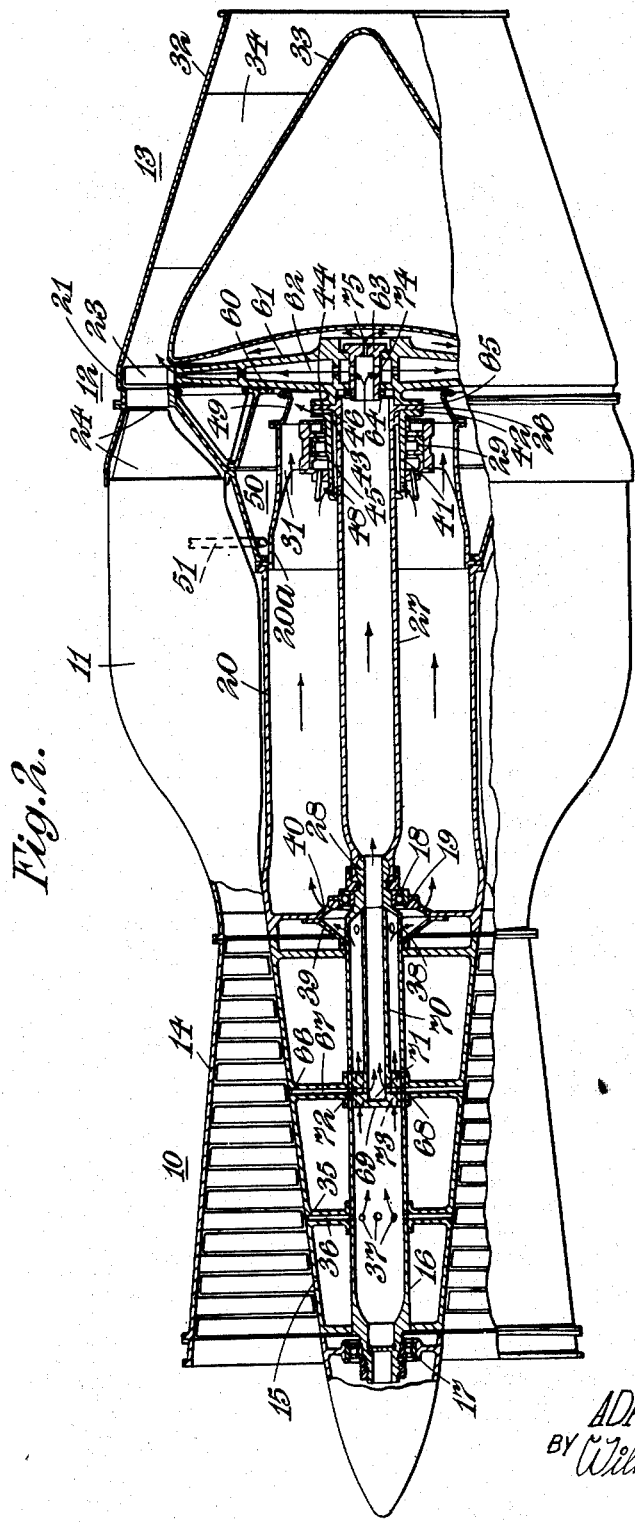

Two constructions of gas-turbine-engine including axial flow compressors will now be described by way of example of this invention, reference being made in the description to the accompanying diagrammatic drawings, in which Figure 1 is an elevation partly in section through one construction, and Figure 2 is a similar view of an alternative construction.

Figure 3:
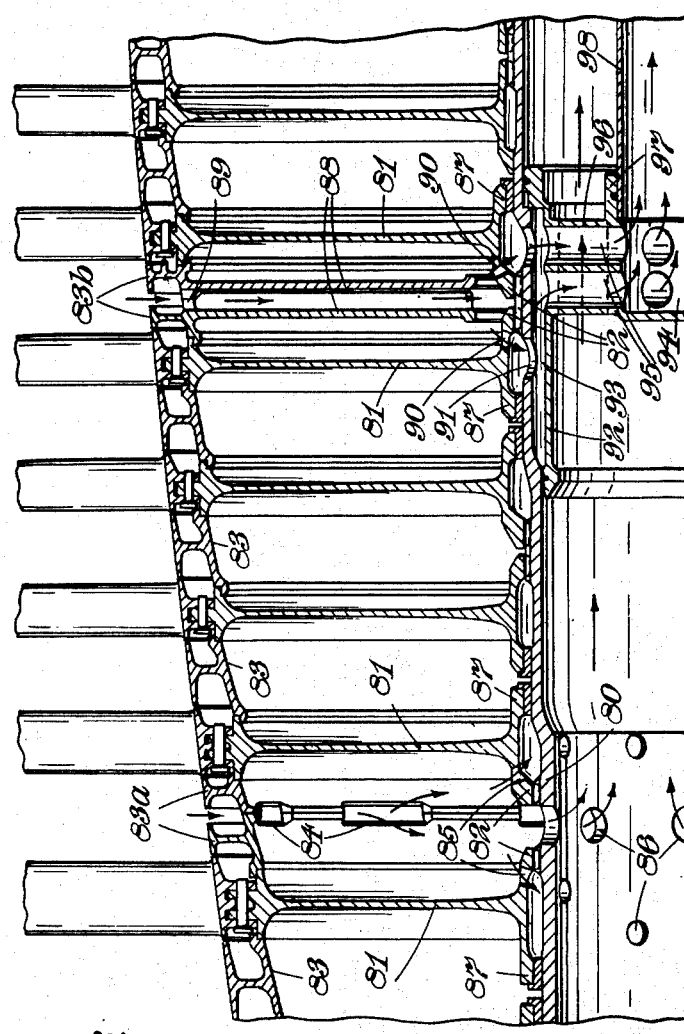

Figure 3 illustrates one manner of abstracting cooling air from an axial-type compressor.

Like references are employed in Figures 1 and 2 to indicate like parts.

Referring to Figure 1, the gas-turbine-engine comprises an axial compressor 10, which delivers air under pressure to a series of combustion chambers 11 in which fuel is burnt, a single stage axial-flow turbine 12 receiving the combustion products from the combustion chambers 11, and an exhaust assembly 13 by which the exhaust gases from the turbine 12 are conducted rearwardly.

The axial compressor 10 comprises a stator casing 14 carrying the compressor fixed blading and a hollow rotor drum 15 carrying the rotor blading. The drum 15 is mounted on a hollow shaft 16 to rotate therewith, the shaft being supported at its forward end in a bearing 17 mounted in the stationary structure of the engine and at its rearward end in a bearing 18 carried in a housing 19 supported from an intermediate casing 20 which extends between the compressor 10 and turbine 12.

The turbine 12 comprises a stationary shroud ring 21 encircling the turbine disc 22 carrying the rotor blading 23 and a nozzle-guide-vane assembly 24 by which the combustion products leaving the combustion chambers 11 are directed on to the turbine blades. The turbine disc 22 is formed on its front face with a radial flange 25 by which the turbine disc is bolted to a flange 26 on a hollow shaft 27 extending forwardly coaxially with the shaft 16 to be drivingly coupled to the shaft 16 through a driving coupling 28 located adjacent the bearing 18. The coupling permits a degree of angular freedom between the shafts 16 and 27. The shaft 27 is supported at its rear end adjacent the turbine disc by a bearing 29 accommodated in a housing 30 supported by radial webs 31 extending inwardly from a part 20a of the intermediate casing structure 20.

The exhaust assembly 13 comprises an outer casing 32 which is bolted to the turbine shroud ring 21 and a substantially conical fairing 33 supported by strut fairings 34 from the casing 32. The outer casing 32 and fairings 33 define between them an annular passage for the exhaust gases, which passage merges at the apex of the fairing 33 into a cylindrical exhaust passage.

The intermediate casing 20 lies between the shaft 27 and the combustion chambers 11 which are disposed in a ring around the shaft.

It will be appreciated that it is desirable to provide means for cooling the bearings 18 and 29 and this invention provides improved means for this purpose.

The rotor drum 15 has formed in its surface between two compression stages, say the 3rd and 4th stages, a series of circumferential slots 35 and these slots communicate with radial ducts 36 formed in a convenient manner in the drum. The radial ducts 36 communicate at their inner ends with ports 37 opening to the interior of the hollow shaft 16, the forward end of which is closed, so that air under pressure can flow from the compressor pressure space into the interior of the shaft 16. The pressure air flows rearwardly through the shaft 16 towards the bearing 18 and part of it flows out from the shaft through ports 38 formed in the shaft 16 into a space between a radial wall 39 secured to the intermediate casing 20 and the bearing housing 19 and from this space through ports 40 into the interior of the intermediate casing 20. This part of the air thus flows around the exterior of the bearing housing 19 to cool it. The air may also be arranged to flow over any auxiliary equipment located in the region of the bearing about the shaft. Such equipment may comprise bevel driving gear for supplying power to drive fuel pumps, auxiliary compressor, hydraulic pumps and the like equipment normally associated with the engine.

The remainder of the air flows rearwardly through the coupling 28 and the shaft 27 to adjacent the turbine disc where it is employed for cooling the bearing 29.

For this purpose, the inner race of the bearing 29 is carried on a hollow sleeve 41 having a flange 42 at its rearward end by which the sleeve is bolted to the flange 26 on the shaft. The sleeve 41 is arranged to bear on the shaft at its forward end and at its rearward end to spigot on to a step 43 formed on the shaft adjacent the flange and to be spaced from the shaft intermediate its ends. Radial channels 44 are cut in the flange 42 and these channels communicate at their inner ends with the space 45 between the sleeve 41 and shaft 27 through inclined slots 46 cut in the step 43. A plurality of axially-spaced sets of ports 47 are formed in the shaft 27 so that the air flowing in the shaft can flow outwardly into the space 45 from which part flows through ports 48 in the forward end of the sleeve and part flows through the slots 46 and channels 44, thus cooling the bearing 29 internally and also the flanges 25, 26, and 42. In operation of the engine, the channels 44 act as a centrifugal impeller assisting the air flow through the space 45.

The air entering the intermediate casing through ports 40 and 48 flows rearwardly over the outside of the bearing housing 30 and between the webs 31 to join the air flowing from channels 44 and then flows outwardly along the front face of the turbine disc to cool it.

The cooling air finally flows around a deflector 49 mounted on the wall 20a into a chamber 50 from which it flows to atmosphere through a duct 51.

In gas-turbine-engines of which the turbine has a hollow rotor disc, formed for example by a pair of dished disc members with the turbine blades retained between their peripheries, it is desirable also to supply cooling air to the interior of the turbine disc and according to an important feature of this invention, cooling air is supplied to the interior of the turbine disc from the hollow turbine shaft.

It will be appreciated that for cooling the engine bearings, it is preferable to employ relatively cool air and that as the air exhausts to atmosphere, its pressure need not be very high to produce the desired air flow. Therefore the air for cooling the bearings can be abstracted from the compressor at a relatively low pressure region, i. e. a region in which the air temperature has not been raised excessively due to compression.

It will be appreciated, moreover, that since the air employed for cooling the turbine disc internally is delivered into the gas flow through the engine, it is necessary that the air shall be at a pressure at least in excess of the pressure in the exhaust assembly, and therefore in order to provide an adequate flow of air it is extracted from a region of the compressor where the air is compressed to a higher pressure than that in the region from which the air employed for bearing cooling would normally be extracted. Since, extraction from a higher pressure region means that the air temperature would be higher than that of air at a pressure adequate for maintaining a flow for cooling the bearings, it is preferred to abstract the air for bearing cooling and the air for turbine cooling separately from the compressor. The higher temperature of the turbine disc cooling air presents no major disadvantage as the turbine disc operates at a temperature substantially higher than that reached in the compressor due to air compression, and consequently an adequate temperature differential exists.

One arrangement of gas-turbine-engine in which the air for cooling the bearings is abstracted separately from that for cooling a hollow turbine disc is illustrated in Figure 2.

The gas-turbine-engine is similar in construction to that illustrated in Figure 1, but instead of a solid turbine disc, the engine has a hollow turbine disc formed from two dished disc-members 60, 61 assembled with their concave faces together so as to form an annular passage 62 through which air can flow outwardly. The blading 23 is held between the peripheral edges of the disc members 60, 61 and these members are nipped together at their centre by a hollow bolt 63 and a ring nut 64. The member 60 is formed with a flange 65 by which the turbine disc is bolted to the flange 26 on shaft 27.

The bearing 18 is cooled in a manner similar to that described with reference to Figure 1, air being abstracted from the compressor through slots 35 and flowing through ducts 36 and ports 37 into shaft 16 and along shaft 16 to ports 38. In this construction, however, the whole of the air entering the shaft through ports 37 leaves by ports 38 and flows over the centre bearing 18 into the intermediate casing 20 and then rearwardly to the bearing 29, where the air flow divides, part passing over the bearing housing 30 between webs 31 and part flowing into space 45 through ports 48 and then out through channels 44. The centrifugal impeller action of the channels assists this latter flow.

Air for cooling the turbine disc internally is abstracted from a higher pressure region of the compressor, say from between the 7th and 8th compressor stages, through circumferential slots 66 in the drum 15 opening to a plurality of radial ducts 67 which lead at their inner ends to ports 68 in the shaft 16. The ports 68 feed to a collector manifold 69, located within the shaft which manifold delivers the air to a conduit 70 extending rearwards coaxially within the shaft 16 from the manifold to a reduced portion of the shaft in which the end of the conduit 70 is fitted. The manifold 69 is formed with a central collecting chamber 71 connected to the ports 68 by ducts 72 in arms 73 radiating from the manifold 69, this arrangement being adopted to permit the passage of the bearing cooling air from the ports 37 between the arms 73 around the outside of conduit 70 to ports 38.

The air from conduit 70 flows through the coupling 28 along shaft 27 into the hollow bolt 63 from whence it flows partly outwardly through ports 74 in the bolt into the passage 62 between the dished members 60, 61 and partly through a passage 75 in the head of the bolt 63 to the space between the rear face of the turbine disc and base plate of the conical structure 33 within the exhaust assembly 13 and over the rear face of the turbine disc to cool it.

The air flowing outwards within the turbine disc enters the gas flow through the engine by passing through channels in the peripheries of the discs 60, 61 and in the blade roots.

Referring to Figure 3, there is illustrated one convenient method of abstracting air for cooling purposes from a compressor, which is of the axial type and comprises a rotor drum constructed as set forth in the specification of co-pending application, Serial No. 8,198, filed February 13, 1948, now Patent No. 2,618,463, issued November 18, 1952. The rotor drum comprises a hollow central rotor shaft 80, supporting a number of blade carrying discs 81, corresponding to the number of stages of the compressor. The discs 81 at their inner edges are formed with axially-extending cylindrical portions 82, 87, one 82 of which portions is internally splined to have a splined engagement with the shaft in such manner as to leave the discs axially free on the shaft, whilst the other 87 provides a plain internal cylindrical surface seating on the exterior surface of the shaft 80. Spacer rings 83 are located between the peripheral edges of the discs 81 and the whole assembly is nipped axially. The spacer ring 83a between one pair of discs, e. g. third and fourth stage discs, is formed with a number of circumferentially-spaced ports 84 which connect the compressor pressure space with a radial passage constituted between the blade-carrying drum and the shaft and bounded axially by the third and fourth stage discs. This latter space communicates through a series of ports 85 in the portions 82 and ports 86 formed in the shaft with the interior of the shaft. The air entering the shaft from the ports 86 is at a relatively low pressure and temperature and is suitable for bearing cooling purposes.

For abstracting high pressure air for cooling of a hollow turbine disc in the manner described with reference to Figure 2, the spacer ring between two later compression stages is formed in two abutting halves 83b provided with inwardly-directed, ribbed flanges 88 forming between them radial passages extending from slot-like ports 89 in the spacer ring to adjacent the shaft. Air flowing through the radial passages passes through ports 90 in the portions 82 of the discs 81 and ports 91 in the shaft into a manifold.

The manifold comprises a sleeve-like portion 92 which is sealed at its end to the inner surface of the shaft so as to provide between it and the shaft an annular collector space 93, and a central chamber 94 connected to the space 93 by radial ducts 95 formed in arms 96 radiating from the chamber 94. The spaces between the arms 96 provide passages for the air entering the shaft from the low pressure region. The central chamber 94 is formed with a rearwardly extending outlet neck 97 into which is sealed a duct 98 which is coaxial with the shaft.

The bearing cooling air flows in the annular space around the duct 98 to its outlets and the duct 98 will extend rearwardly, for example as described with reference to Figure 2, to a reduced portion of the shaft beyond the region of the bearing cooling air outlets.

I claim:

1. A gas-turbine engine comprising a compressor rotor; first ports in the axial length of said compressor rotor opening to a first region of the compressor where the air has been compressed;

second ports in the axial length of said compressor rotor opening to a second region where the air has been compressed to a greater extent than at said first region; a hollow turbine rotor coaxial with and axially-spaced from said compressor rotor; a hollow shaft whereon said compressor rotor is mounted and drivingly connecting said compressor rotor and said turbine rotor, said hollow shaft providing a pair of coaxial air ducts whereof the first duct is connected with said first region through said first ports and the second duct is connected with said second region through said second ports; bearing means for said shaft; outlet ports in said first duct adjacent said bearing means, through which air compressed in said compressor is delivered to cool said bearing means; and further outlet ports in said second duct connecting with the interior of said hollow rotor through which air compressed to a higher pressure is delivered to cool said hollow rotor.

2. A gas-turbine engine comprising a hollow shaft providing a pair of coaxial air ducts, an axial flow compressor rotor which has a plurality of axially-spaced blade-carrying discs mounted on said hollow shaft and spacer rings between said discs to abut them at their periphery, first ports in one of said rings to place the space between its associated pair of discs in communication with a first region of the compressor where air has been compressed, second ports in said shaft to place the first of said coaxial ducts in communication with said space between said pair of discs, bearing means for said shaft, outlet ports from said first coaxial duct adjacent said bearing means whereby air entering said first coaxial duct from said first region through said first and second ports is constrained to flow over said bearing means to cool it, third ports in a second of said rings to place the space between the pair of discs associated with said second ring in communication with a second region of the compressor where air has been compressed, a manifold in said hollow shaft having a central collecting chamber in communication with said second mentioned space and with said second coaxial duct, a turbine rotor drivingly connected with said shaft and arranged coaxially with and axially-spaced from said compressor rotor, and outlet means from said second coaxial duct adjacent the turbine rotor through which cooling air is supplied from said second region through said manifold and said second coaxial duct to said turbine rotor.

3. A gas-turbine engine as claimed in claim 1, comprising also outlets from the second duct to the rear face of the hollow turbine rotor.

4. A gas-turbine engine comprising a compressor rotor; a coaxially-arranged axially-spaced hollow turbine rotor; a hollow shaft whereon said compressor rotor is mounted, drivingly connecting said compressor rotor to said turbine rotor and providing a pair of coaxial air ducts; a first set of ports in the axial length of said compressor rotor opening to a region of the compressor where air has been compressed to a relatively low pressure and connecting with one of said air ducts; a first bearing device supporting said shaft for rotation adjacent the outlet end of said compressor rotor; outlet ports from said one of said air ducts adjacent said first bearing device; a second bearing device supporting said shaft for rotation adjacent said turbine rotor; means externally of said shaft to constrain air issuing from said outlets to flow around both said bearing devices; a second set of ports in the axial length of said compressor rotor opening to a region of the compressor where air is compressed to a relatively high pressure and connecting with the other of said air ducts; and outlet ports from said other of said air ducts to the interior of said hollow rotor.

5. A gas-turbine engine as claimed in claim 4, wherein said second bearing device engages with the shaft through a hollow sleeve secured on the shaft to provide a space between the sleeve and shaft, wherein inlet ports and outlet ports are provided in the sleeve to permit air constrained to flow around the bearing devices to pass into said space at one end of said sleeve and to flow out of said space at the other end of said sleeve, and wherein the outlets from the said space are in the form of radial channels which act as a centrifugal impeller to assist in creating an air flow through said space.

6. A gas-turbine engine comprising a compressor rotor; a coaxially-arranged axially-spaced hollow turbine rotor; a hollow shaft comprising a compressor portion whereon said compressor rotor is mounted, a turbine portion whereon said turbine rotor is mounted and a driving coupling between said portions; a pair of air ducts in said compressor portion; a first set of ports in the axial length of said compressor rotor opening to a region of the compressor where air has been compressed to a relatively low pressure; and connecting with one of said air ducts bearing means supporting said compressor portion for rotation; outlet ports from said one of said ducts adjacent said bearing means whereby air delivered into said one of said ducts is constrained to flow over said bearing means to cool it; and outlet ports from said other of said air ducts to the interior of said hollow rotor; a duct connection through said driving coupling and connecting the other of said air ducts with the interior of said turbine portion; and outlet ports from said turbine portion to the interior of said hollow rotor.

7. A gas-turbine engine comprising a compressor rotor; a turbine rotor coaxial with and axially-spaced from the compressor rotor; a hollow shaft drivingly connecting said compressor rotor and said turbine rotor and comprising a first hollow shaft portion whereon said compressor rotor is mounted and a second hollow shaft portion whereon said turbine rotor is mounted; a flexible driving coupling between said first hollow shaft portion and said second hollow shaft portion, said flexible driving coupling comprising a hollow part-spherical member on the end of said first hollow shaft portion, and a complementary hollow part-spherical member on the end of said second hollow shaft portion and engaging said part-spherical member on said first portion to provide a degree of flexibility between said two portions; first bearing means supporting said first hollow shaft portion; second bearing means supporting said second hollow shaft portion; means including inlet ports in the axial length of said compressor rotor opening a region of the compressor where the air has been compressed to deliver compressed air from said inlet ports into said first hollow shaft portion; first outlet ports in said first hollow shaft portion adjacent to said first bearing means; and second outlet ports in said second hollow shaft portion adjacent to said second bearing means; whereby air delivered from said inlet ports into said first hollow shaft portion flows partly through said first outlet ports adjacent to said first bearing means to cool it and partly through said hollow portions of said shaft and through said second outlet ports adjacent to said second bearing means to cool it.

8. A gas-turbine engine comprising a compressor rotor; a turbine rotor comprising a pair of axially-spaced disc members defining a space between them, said rotor being coaxial with and axially spaced from said compressor rotor; a hollow shaft whereon said compressor rotor is mounted, drivingly connecting said compressor rotor to said turbine rotor and providing a pair of coaxial air ducts; a first set of ports in the axial length of said compressor rotor opening to a region of the compressor where air has been compressed to a relatively low pressure and connecting with one of said air ducts; a first bearing device supporting said shaft for rotation adjacent the outlet end of said compressor rotor; outlet ports from said one of said air ducts adjacent said first bearing device; a second bearing device supporting said shaft for rotation adjacent said turbine rotor; means externally of said shaft to constrain air issuing from said outlets to flow around both said bearing devices; a second set of ports in the axial length of said compressor rotor opening to a region of the compressor where air is compressed to a relatively high pressure and connecting with the other of said air ducts; and outlet ports from said other of said air ducts to said space between said pair of discs of the turbine rotor.

9. A gas-turbine engine as claimed in claim 8, wherein said second bearing device engages with the shaft through a hollow sleeve secured on the shaft to provide a space between the sleeve and shaft, wherein inlet ports and outlet ports are provided in the sleeve to permit air constrained to flow around the bearing devices to pass into said space at one end of said sleeve and to flow out of said space at the other end of said sleeve, and wherein the outlets from the said space are in the form of radial channels which act as a centrifugal impeller to assist in creating an air flow through said space.

10. A gas-turbine engine comprising a compressor rotor; a turbine rotor comprising a pair of axially-spaced disc members defining a space between them, said rotor being coaxial with and axially spaced from said compressor rotor; a hollow shaft comprising a compressor portion whereon said compressor rotor is mounted, a turbine portion whereon said turbine rotor is mounted and a driving coupling between said portions; a pair of air ducts in said compressor portion; a first set of ports in the axial length of said compressor rotor opening to a region of the compressor where air has been compressed to a relatively low pressure; and connecting with one of said air ducts bearing means supporting said compressor portion for rotation; outlet ports from said one of said ducts adjacent said bearing means whereby air delivered into said one of said ducts is constrained to flow over said bearing means to cool it; and outlet ports from said other of said air ducts to said space between said pair of discs of the turbine rotor; a duct connection through said driving coupling and connecting the other of said air ducts with the interior of said turbine portion; and outlet ports from said turbine portion to said space between said pair of discs of the turbine rotor.

11. A gas-turbine engine comprising a compressor rotor; first ports in the axial length of said compressor rotor opening to a first region of the compressor where the air has been compressed; second ports in the axial length of said compressor rotor opening to a second region where the air has been compressed to a greater extent than at said first region; a turbine rotor comprising a pair of axially-spaced discs defining a space between them, said turbine rotor being coaxial with and axially-spaced from said compressor rotor; a hollow shaft whereon said compressor rotor is mounted and drivingly connecting said compressor rotor and said turbine rotor, said hollow shaft providing a pair of coaxial air ducts whereof the first duct is connected with said first region through said first ports and the second duct is connected with said second region through said second ports; bearing means for said shaft; outlet ports in said first duct adjacent said bearing means, through which air compressed in said compressor is delivered to cool said bearing means; and further outlet ports in said second duct connecting with said space between said pair of discs of the turbine rotor through which air compressed to a higher pressure is delivered to cool said hollow rotor.

12. A gas-turbine engine as claimed in claim 11, comprising also outlets from the second duct to the rear face of the rearmost of said pair of discs of said turbine rotor.

ADRIAN ALBERT LOMBARD.

References Cited in the file of this patent

UNITED STATES PATENTS

| Number | Name | Date |
| --- | --- | --- |
| 2,084,463 | Stalker | June 22, 1937 |
| 2,117,131 | Auger | May 10, 1938 |
| 2,401,826 | Halford | June 11, 1946 |
| 2,409,176 | Allen | Oct. 15, 1946 |
| 2,435,528 | Barlow | Feb. 3, 1948 |
| 2,435,557 | Eyre | Feb. 3, 1948 |
| 2,473,356 | Birmann | June 14, 1949 |

FOREIGN PATENTS

| Number | Country | Date |
| --- | --- | --- |
| 665,762 | Germany | Oct. 3, 1938 |

OTHER REFERENCES

Flight, article entitled "Metro-Vick Gas Turbine," dwg. on pp. 420(a) and 420(b), and descriptive matter on pp. 422 and 423, Apr. 25, 1946.